US012773070B2

(12) United States Patent
Boos

(10) Patent No.: US 12,773,070 B2
(45) Date of Patent: Oct. 27, 2026

(54) CONTAINER FOR MIXING LIQUIDS

(71) Applicant: Jonathan Boos, Sarasota, FL (US)

(72) Inventor: Jonathan Boos, Sarasota, FL (US)

(73) Assignee: Trove IP Holdings LLC, Sarasota, FL (US)

( * ) Notice: Subject to any disclaimer, the term of this patent is extended or adjusted under 35 U.S.C. 154(b) by 585 days.

(21) Appl. No.: 18/142,344

(22) Filed: May 2, 2023

(65) Prior Publication Data

US 2024/0366034 A1 Nov. 7, 2024

(51) Int. Cl.
*A47J 43/27* (2006.01)
*B01F 33/501* (2022.01)

(52) U.S. Cl.
CPC ......... *A47J 43/27* (2013.01); *B01F 33/50111* (2022.01)

(58) Field of Classification Search
CPC ............................ B01F 33/50111; A47J 43/27
USPC .......................... 366/130; 220/568, 623, 670
See application file for complete search history.

(56) References Cited

U.S. PATENT DOCUMENTS

| | | | | |
|---|---|---|---|---|
| 924,969 A | | 6/1909 | Wolf | |
| D47,759 S | | 8/1915 | Pick | |
| 3,495,736 A | | 2/1970 | Ragettli | |
| D329,170 S | | 9/1992 | Hoffer | |
| D369,277 S | * | 4/1996 | Lin | D7/529 |
| D460,894 S | | 7/2002 | Ziegenfus | |
| D709,330 S | | 7/2014 | Holmes | |
| 9,420,920 B2 | | 8/2016 | Holmes | |
| D842,042 S | | 3/2019 | Ke | |
| 11,613,420 B2 | | 3/2023 | Beardsell | |
| 2013/0181004 A1 | | 7/2013 | Jung et al. | |
| 2014/0192610 A1 | | 7/2014 | Holmes | |
| 2022/0110486 A1 | | 4/2022 | Barnard et al. | |

FOREIGN PATENT DOCUMENTS

| | | |
|---|---|---|
| CN | 104083052 A | 10/2014 |
| CN | 205359081 U | 7/2016 |
| EP | 1210890 B1 | 8/2005 |

OTHER PUBLICATIONS

Extended European Search Report, for European Patent Application No. 24150930.6, dated Jul. 8, 2024, 8 pages.
Helimix Vortex Blender, posted Dec. 17, 2017 [online], [retrieved Jul. 9, 2025]. Retrieved from internet, https://www.amazon.com/Blending-Portable-Cocktails-Smoothies-Dishwasher/dp/B078KCYLZF/ (Year: 2017).
Cockshier Hybrid Cocktail Shaker Set, posted Apr. 17, 2023 [online], [retrieved Jul. 9, 2025]. Retrieved from internet, https://www.amazon.com/Cocktail-Shaker-Bar-Set-Innovative/dp/BOC2TFQ5DN (Year: 2023).

* cited by examiner

*Primary Examiner* — David L Sorkin
(74) *Attorney, Agent, or Firm* — Westman, Champlin & Koehler, P.A.; Amanda M. Prose

(57) ABSTRACT

A container for mixing includes a container body having a first end with an opening and a second end opposite the first end. The second end has a closed rounded shape. The container body further includes a container wall between the opening and the second end. The container wall has an interior surface with a single substantially continuous rounded wall face with a plurality of smooth indentations therein arranged in a helical configuration around the wall face between the opening and the second opposite end.

19 Claims, 7 Drawing Sheets

CONTAINER FOR MIXING LIQUIDS

SUMMARY

In one embodiment, a container for mixing includes a container body having a first end with an opening and a second end opposite the first end. The second end has a closed rounded shape. The container body further includes a container wall between the opening and the second end. The container wall has an interior surface with a single substantially continuous rounded wall face with a plurality of smooth indentations therein arranged in a helical configuration around the wall face between the opening and the second opposite end.

In another embodiment, an insert for a drinking vessel includes a mixing body having a wall, a first end at a first end of the wall comprising an opening, and a second end at an opposite second end of the wall, the second end comprising a closed rounded shape. The container wall includes an interior surface having a rounded wall face with a plurality of smooth indentations therein arranged in a helical configuration around the wall face between the opening and the second opposite end.

This summary is not intended to describe each disclosed embodiment or every implementation of mixing containers as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Figure 1:
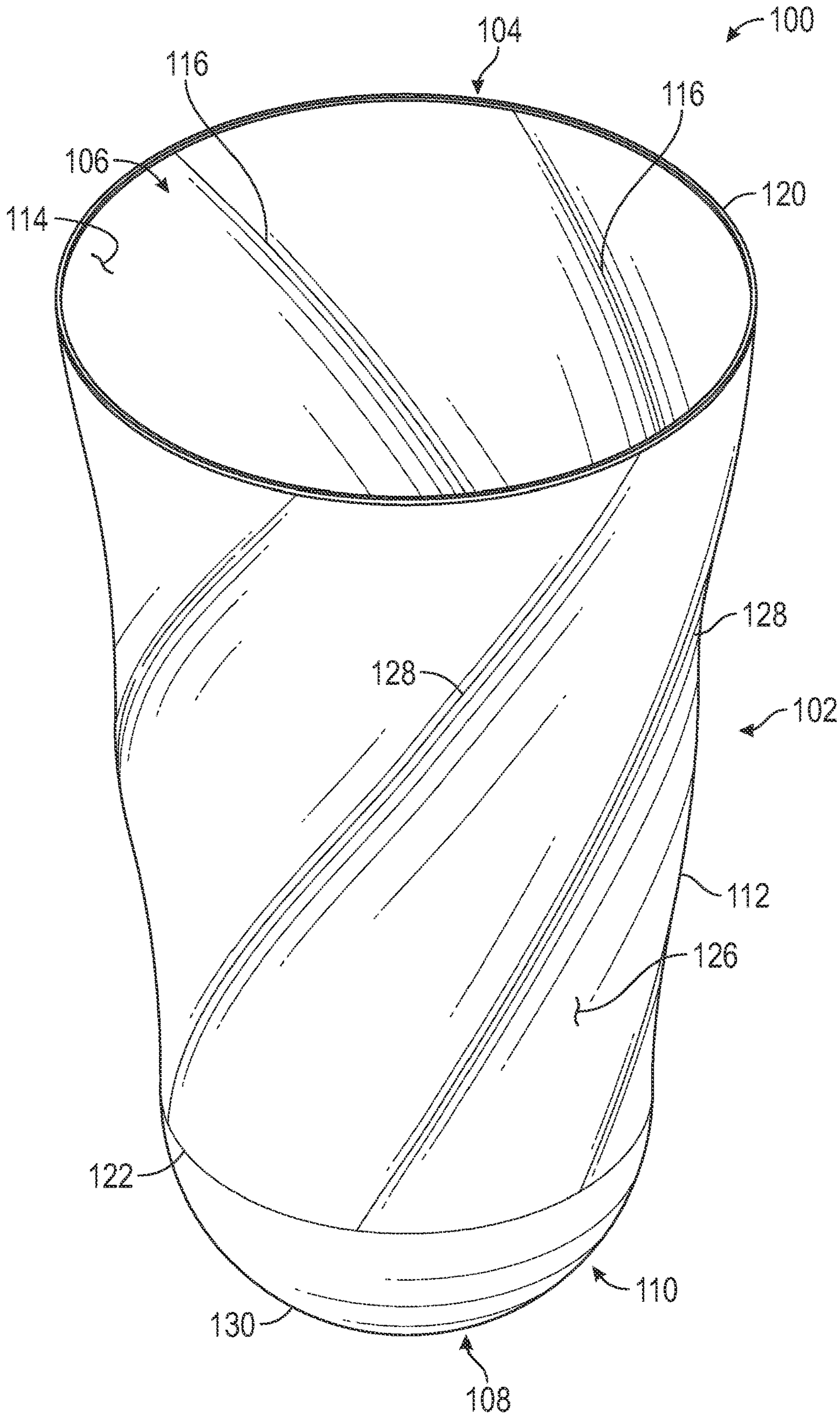
FIG. 1 is a front isometric view of a container according to an embodiment of the present disclosure.
Figure 2:
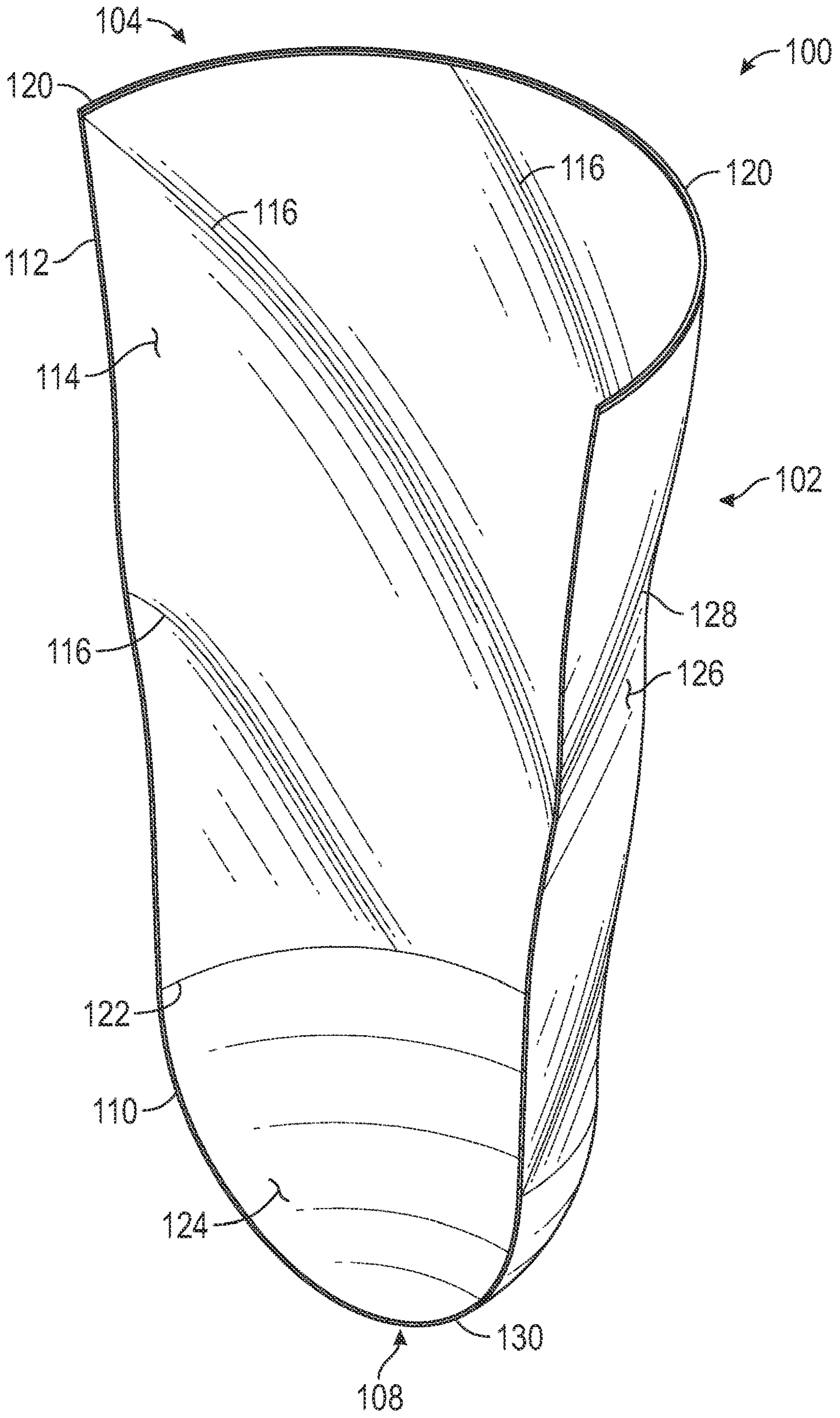
FIG. 2 is a cutaway view of the container of FIG. 1.
Figure 3:
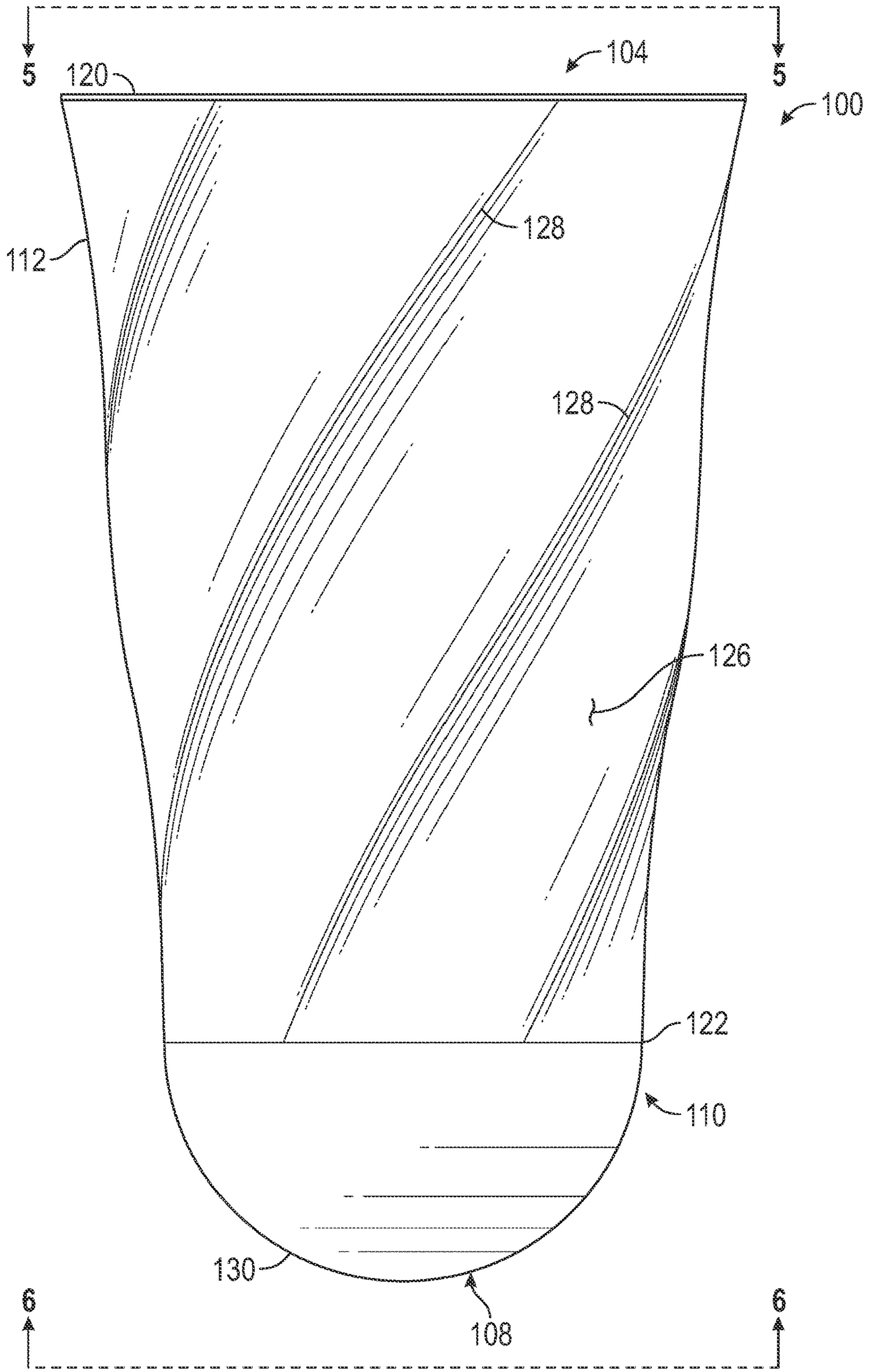
FIG. 3 is a front and rear elevation view of the container of FIG. 1.
Figure 4:
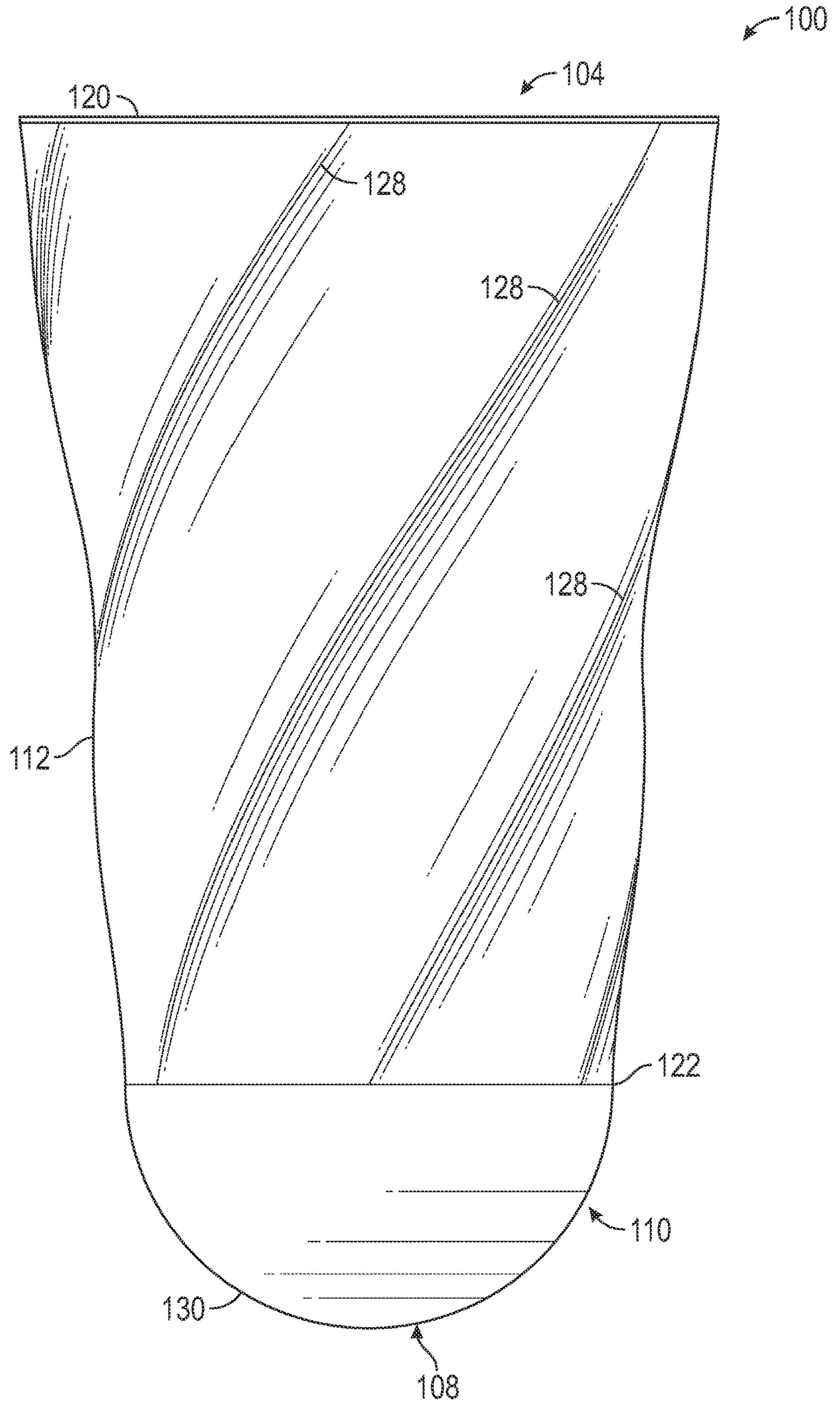
FIG. 4 is a left and right elevation view of the container of FIG. 1.
Figure 5:
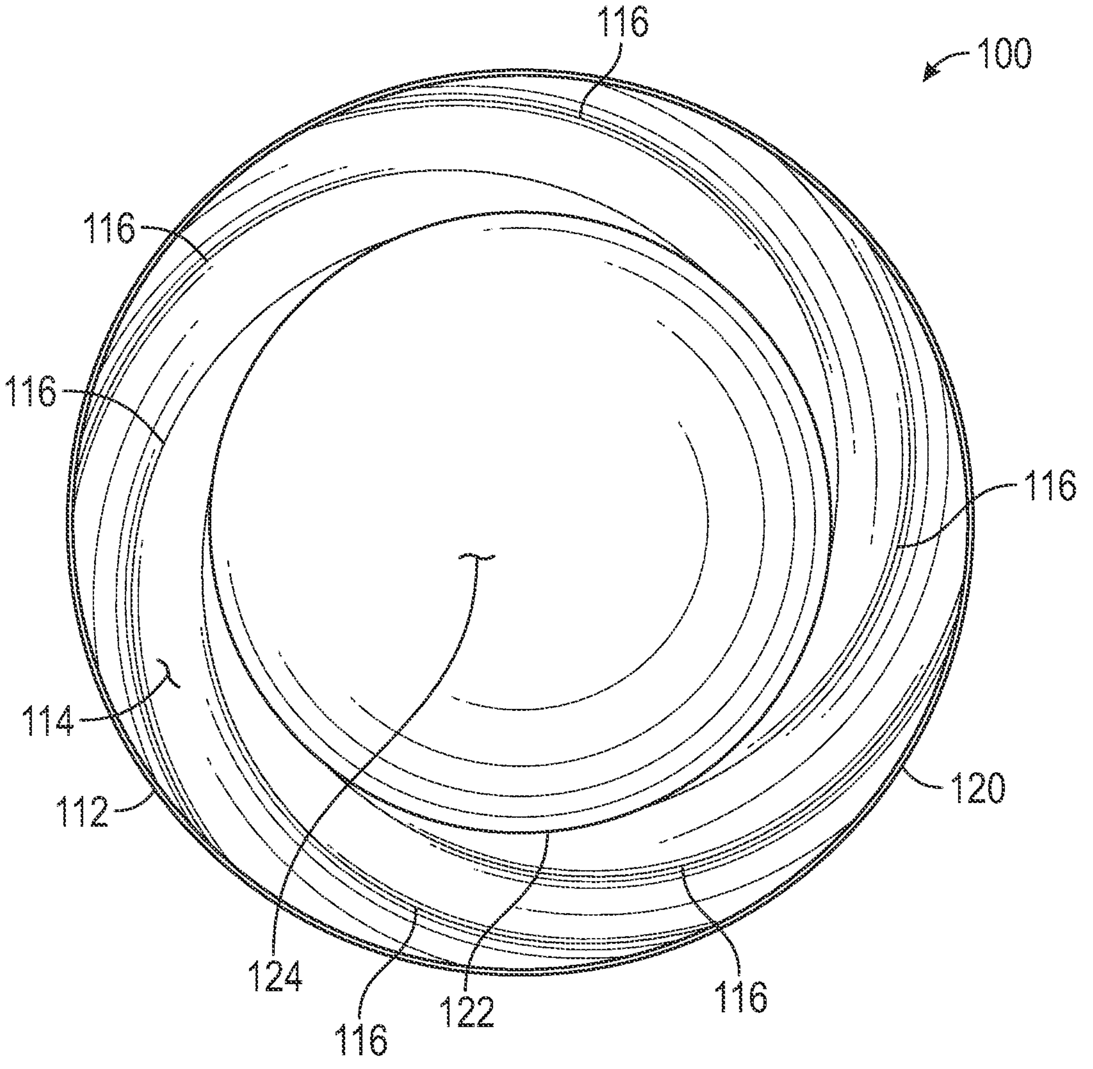
FIG. 5 is a top elevation view of the container of FIG. 1.
Figure 6:
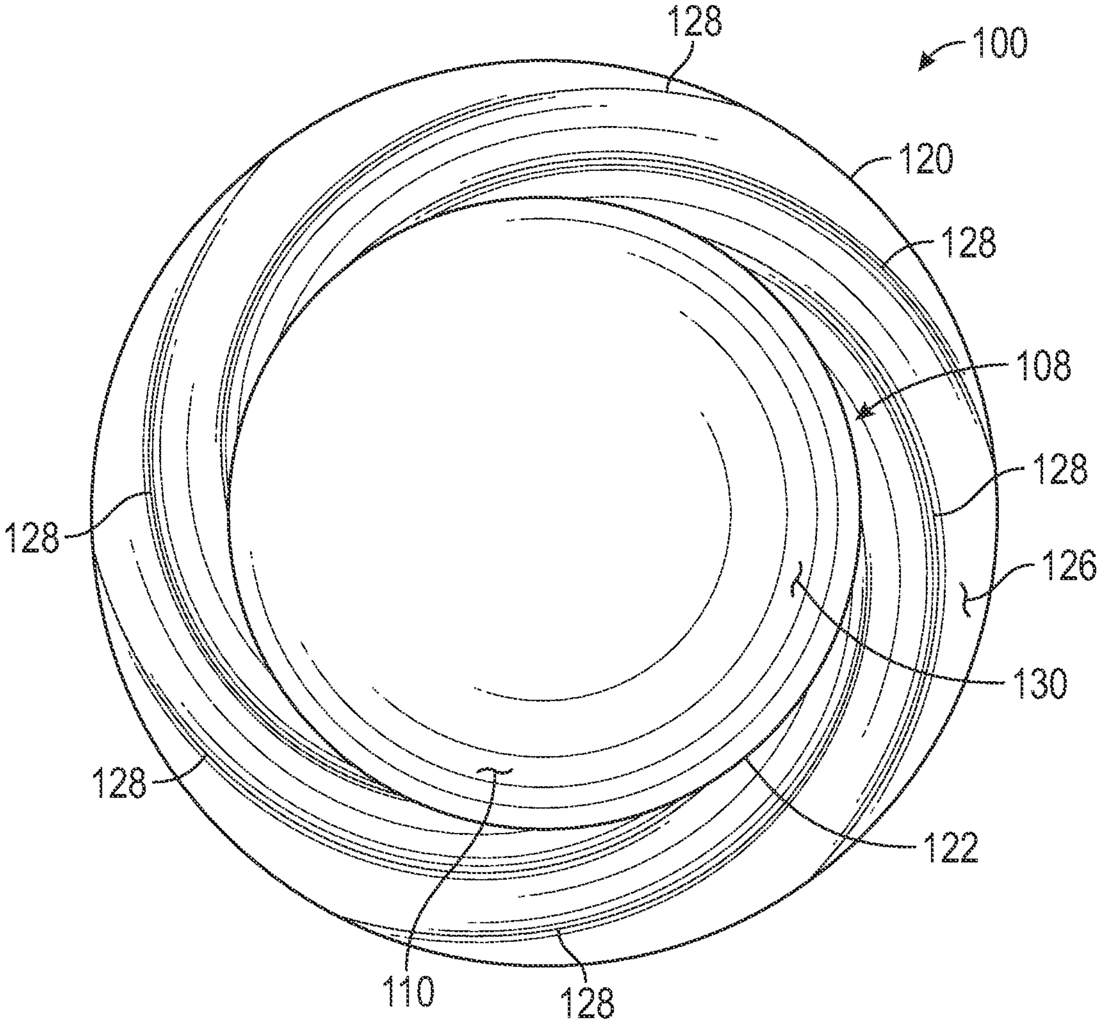
FIG. 6 is a bottom elevation view of the container of FIG. 1.

In general, embodiments of the present disclosure provide a container for mixing liquids or a combination of liquids and other materials such as ice, powders or granules, or the like, therein. The liquids are mixed by a combination of movement of the container by a user and the design of the interior of the container, specifically a twisted or helical configuration that encourages a whirling motion when liquid in the container is shaken. In one embodiment, an interior of the container is provided with rounded helical indentations and/or protrusions that are easy to clean and encourage mixing when liquid in the container is shaken. A rounded "bullet" bottom has no sharp edges for catching, clumping, or creating pockets of unmixed liquids, powders, ice, etc.

Hexagonal and other sharp interior edged containers for mixing liquids create numerous problems with cleanup of such containers. Sharp edges and corners are hard to clean, with nooks and crannies that easily harbor unmixed powders and the like, and are very difficult to clean and to keep clean. In contrast, the smooth edges and rounded bottom of embodiments of the present disclosure remove those crags from the container, allowing for the smooth surfaces not to retain any unmixed or mixed ingredients/liquids. The embodiments of the present disclosure thus provide a more sanitary and easily cleanable mixing vessel.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top." "bottom," "forward." "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

A mixing container 100 according to an embodiment of the present disclosure is shown in FIG. 1. FIGS. 2-6 show the container 100, respectively, in cutaway view in FIG. 2, front (and identical rear) view in FIG. 3, left (and identical right) view in FIG. 4, top view in FIG. 5, and bottom view in FIG. 6.

Container 100 comprises in one embodiment a container body 102 having a first end 104 comprising an opening 106 and a second end 108 opposite the first end 104, the second end 108 having a closed rounded shape 110. The container body 102 further includes a container wall 112 between the opening 106 and the second end closed rounded shape 110. The container wall 112 has an interior surface 114 comprising a single substantially continuous rounded wall face with a plurality of smooth indentations 116 therein arranged in a helical configuration around the wall 112 interior surface 114 between the opening 104 and the second opposite end rounded shape 110.

In one embodiment, the plurality of smooth indentations 116 are equally spaced about the rounded wall face. The number of smooth indentations 116 is in one embodiment at least two, and in another embodiments is six. While six smooth indentations 116 are shown in the figures, it should be understood that at least two smooth indentations 116, or a different number larger than two, are within the scope of the disclosure.

The smooth indentations 116 in one embodiment start at or near a top 120 of the wall 112 and extend around a helical or spiral path toward a bottom 122 of the wall 112. In one embodiment, each smooth indentation 116 subtends an angle of about 120 degrees, but it should be understood that a different subtended angle may be used without departing from the scope of the disclosure. Different subtended angles may be used for more efficient or agitating mixing in various embodiments.

In the various configurations, each of the plurality of smooth indentations 116 may comprise a depression with rounded edges, with the interior surface 114 and the indentations 116 providing a substantially continuous smooth surface without sharp edges or corners. Each of the plurality of smooth protrusions 128 may also provide a protrusion with rounded edges, with the exterior surface 126 and the smooth protrusions 128 providing a substantially continuous smooth exterior surface without sharp edges or corners.

In one embodiment, the second end 108 is shaped like a semispherical dome with a smooth interior surface 124 having no sharp edges or corners, as well as a smooth exterior surface 130 also having no sharp edges or corners. In one embodiment, the container 100 has a larger diameter at the first end 104 that at the second end 108. In another embodiment, the container 100 has a same diameter at the first end 104 and the second end 108.

In one embodiment, the container wall 112 is a single wall having the interior surface 114 with smooth indentations 116, and an exterior surface 126 with smooth protrusions 128 that correspond with the smooth indentations 116. In another embodiment, the smooth protrusions 128 may be different than the smooth indentations. Further, while indentations and protrusions are discussed as interior and exterior features, it should be understood that the indentations and protrusions may be exterior and interior features without departing from the scope of the disclosure.

Still further, in another embodiment, the container wall 112 a double wall configuration having an exterior surface 126 separated from the interior surface 114, for example by a gap. The gap may be insulated, or simply an air gap in various embodiments. In such a configuration, the exterior surface 126 may still comprise a plurality of smooth protrusions 128 matching the plurality of smooth indentations 116 on the interior surface 114. The exterior surface 126 in such a configuration may also comprise a plurality of smooth protrusions 128 different from the plurality of smooth indentations 116 on the interior surface 114. Still further, in such a configuration, the exterior surface 126 may comprise a smooth surface with no protrusions.

In a double wall configuration, the exterior surface 130 may differ from the interior surface 124 of the rounded portion 110. In one embodiment, the exterior surface may be flat on a bottom thereof so as to provide a way for the container to stand upright on its own.

Various lids or caps may be used with the container 100, such as but not limited to snap on lids, screw on lids, friction fit lids, or the like. A lid is used when contents of the container are to be mixed, such as by shaking. For use with a lid, a brim or other lid retaining feature may be included with the container or insert without departing from the scope of the disclosure. Such lid retaining feature may be a part of the top of the container/insert, or may be an extension thereof. Lid retaining features include, by way of example only and not by way of limitation, internal or external threads, lids with gaskets that form a friction fit, such as a silicone gasket, lids that snap on to the top of the container/insert, or the like.

Embodiments of the present disclosure have been described that provide a container for mixing some combination of liquids, ice, powders, granules, or the like. The embodiments provide a helical set of smooth indentations (or protrusions) and a rounded bottom interior, the interior of the container having no sharp edges or corners, rendering it easy to clean. The smooth indentations (or protrusions) help in mixing the contents of the container when it is shaken, with the indentations (or protrusions) causing the contents to agitate and mix more thoroughly than with a straight edged container wall.

The container embodiments described herein may be made of any suitable material, including but not limited to different plastics, stainless steel, aluminum, and the like. In some embodiments, with the rounded exterior bottom portion 110, the containers of the present disclosure may be used as inserts into another vessel so as to insulate an entire combination, or to allow for a container of the type discussed herein to be used in combination with a vessel of a different design. This is possible so long as the container of the present disclosure may be physically placed within the vessel. Alternatively, the container 100 may be a stand-alone container with single or double wall construction, that may stand on its own, or have exterior rounded portions so that it is used in conjunction with a stand or other holder, including a secondary vessel or the like. Such a vessel may have any configuration or shape, design, or the like as long as it is suitably sized to accept the insert/container. Further, even a container not configured as an insert may be used inside another vessel as long as the size of that vessel is suitable to accept the container therein.

Figure 7:
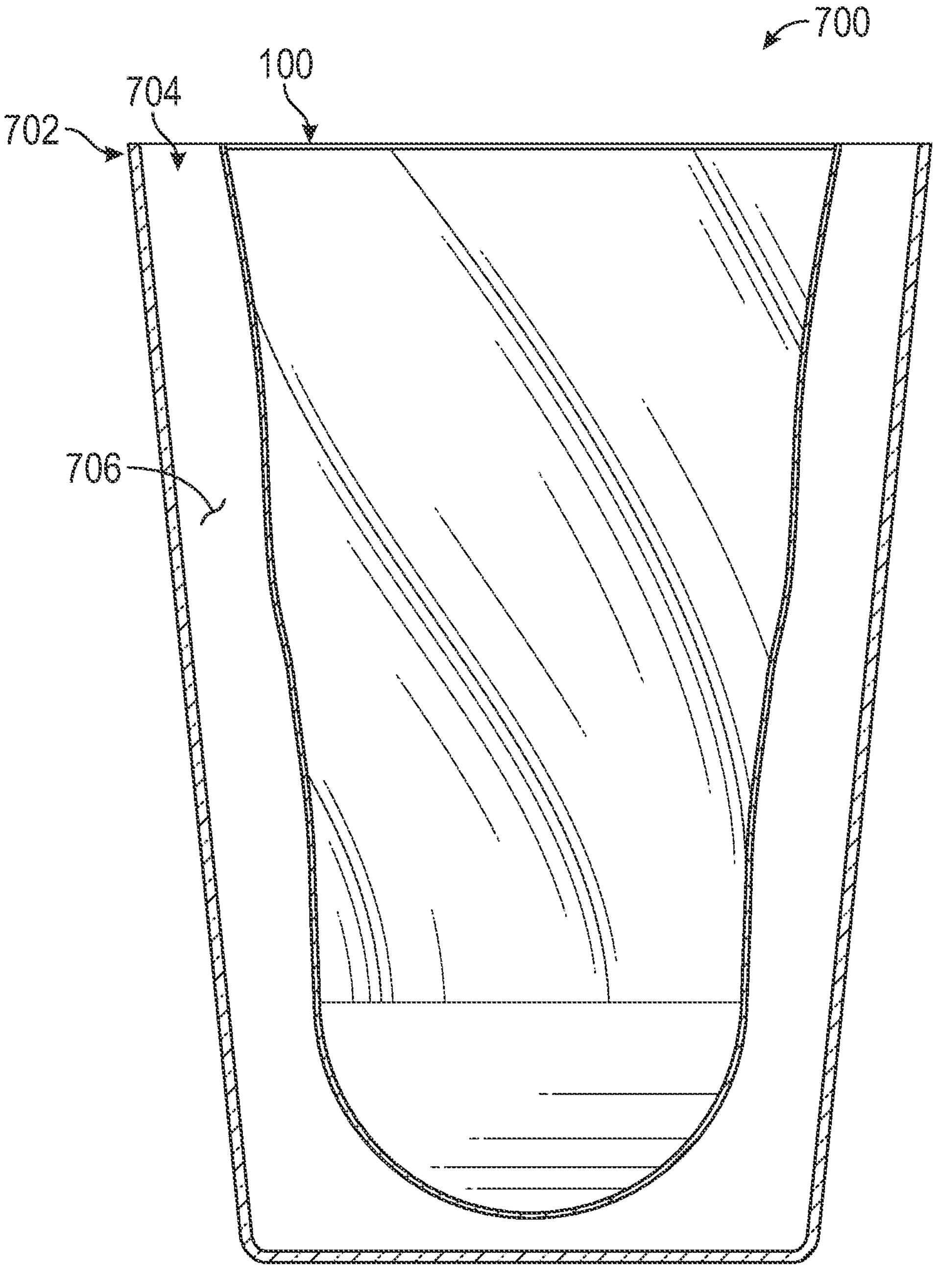
FIG. 7 is a section view of a double wall container according to an embodiment of the present disclosure.

FIG. 7 shows an embodiment 700 in which a container/insert 100 is retained or inserted within a vessel 702. The insert/container 100 fits within an interior space 704 of the vessel 702. A gap 706 is present in one embodiment between an exterior surface 126 of the container 100 and an interior surface 708 of the vessel 700. In one embodiment, for a double wall construction as discussed above, the gap 706 is part of a sealed vessel 700 in which a vacuum seal is formed by sealing the insert/container 100 into the vessel 702. In other embodiments, an insulation layer is used to fill the gap 706. In other embodiments, the insert/container 100 is removably inserted into the vessel 702 and insulation is provided by air in the gap 706. In such configurations, it should be understood that any exterior shape of configuration of the vessel 702 may be used without departing from the scope of the disclosure.

In some embodiments, the interior configuration of the containers of the present disclosure include a smooth space curve with tangent lines at a constant angle with an opening on one end and an enclosed dome on the opposite other end as described herein. When capped with a lid, mix ability of ingredients is enhanced without the need of a separate agitator such as a whisk ball, spatula, spoon, sharp edge, or the like. Directional mixing motion is built within the container's continuous curved surfaces. No sharp edges are present, resulting in a container for which cleaning is straightforward and effective.

When provided with exterior protrusions such as protrusions 128, the container embodiments 100 have ergonomic advantages for gripping and holding the containers 100.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A container for mixing, comprising:

a container body having a first end comprising an opening and a second end opposite the first end, the second end having a closed rounded shape, the container body further comprising a container wall between the opening and the second end, the container wall having an interior surface comprising a single substantially continuous rounded interior wall face with a smooth interior surface with a plurality of smooth, rounded indentations arranged in a helical configuration around the interior wall face and extending between the opening and the second opposite end, the second end being a bottom of the container body and having no corners and wherein the rounded shape of the second end is semispherical.

2. The container of claim 1, wherein the plurality of smooth indentations are equally spaced about the rounded wall face.

3. The container of claim 2, wherein the plurality of smooth indentations comprises six indentations.

4. The container of claim 1, wherein each of the plurality of smooth indentations subtends an angle of approximately 120 degrees between the first end and the second end.

5. The container of claim 1, wherein the container has a larger diameter at the first end than a diameter at the second end.

6. The container of claim 1, wherein the container has a same diameter at the first end and at the second end.

7. The container of claim 1, wherein the container wall is a single wall and wherein the container wall has an exterior surface with a plurality of protrusions matching the plurality of smooth indentations on the interior surface.

8. The container of claim 1, wherein the container wall comprises a double wall configuration having an exterior surface separated from the interior surface.

9. The container of claim 8, wherein the exterior surface comprises a plurality of smooth protrusions matching the plurality of smooth indentations on the interior surface.

10. The container of claim 8, wherein the exterior surface comprises a plurality of smooth protrusions different from the plurality of smooth indentations on the interior surface.

11. The container of claim 8, wherein the exterior surface comprises a smooth exterior surface.

12. The container of claim 8, wherein the exterior surface includes a flat bottom.

13. The container of claim 1, wherein each of the plurality of smooth indentations comprises a depression with rounded edges providing a substantially continuous smooth surface without sharp edges.

14. An insert for a drinking vessel, comprising:

a mixing body comprising a wall, a first end at a first end of the wall comprising an opening, and a second end at an opposite second end of the wall, the second end comprising a semispherical dome with a smooth interior surface having no sharp edges or corners and a smooth exterior surface having no sharp edges or corners;

wherein mixing body wall comprises an interior surface comprising a rounded wall face with a plurality of smooth indentations arranged in a helical configuration around the interior wall face and extending between the opening and the second opposite end.

15. The insert of claim 14, wherein each of the plurality of smooth indentations subtends an angle of approximately 120 degrees between the first end and the second end.

16. The insert of claim 14, wherein the mixing body has a larger diameter at the first end than at the second end.

17. The insert of claim 14, wherein the mixing body has a same diameter at the first end and the second end.

18. The insert of claim 14, wherein the mixing body wall is a single wall and wherein the mixing body wall has an exterior surface with a plurality of protrusions matching the plurality of smooth indentations on the interior surface.

19. The insert of claim 14, wherein each of the plurality of smooth indentations comprises a depression with rounded edges providing a substantially continuous smooth surface without sharp edges.

* * * * *